Oct. 16, 1928.
H. P. SACHSE
1,687,797
MOLDING DEVICE
Filed Sept. 1, 1926
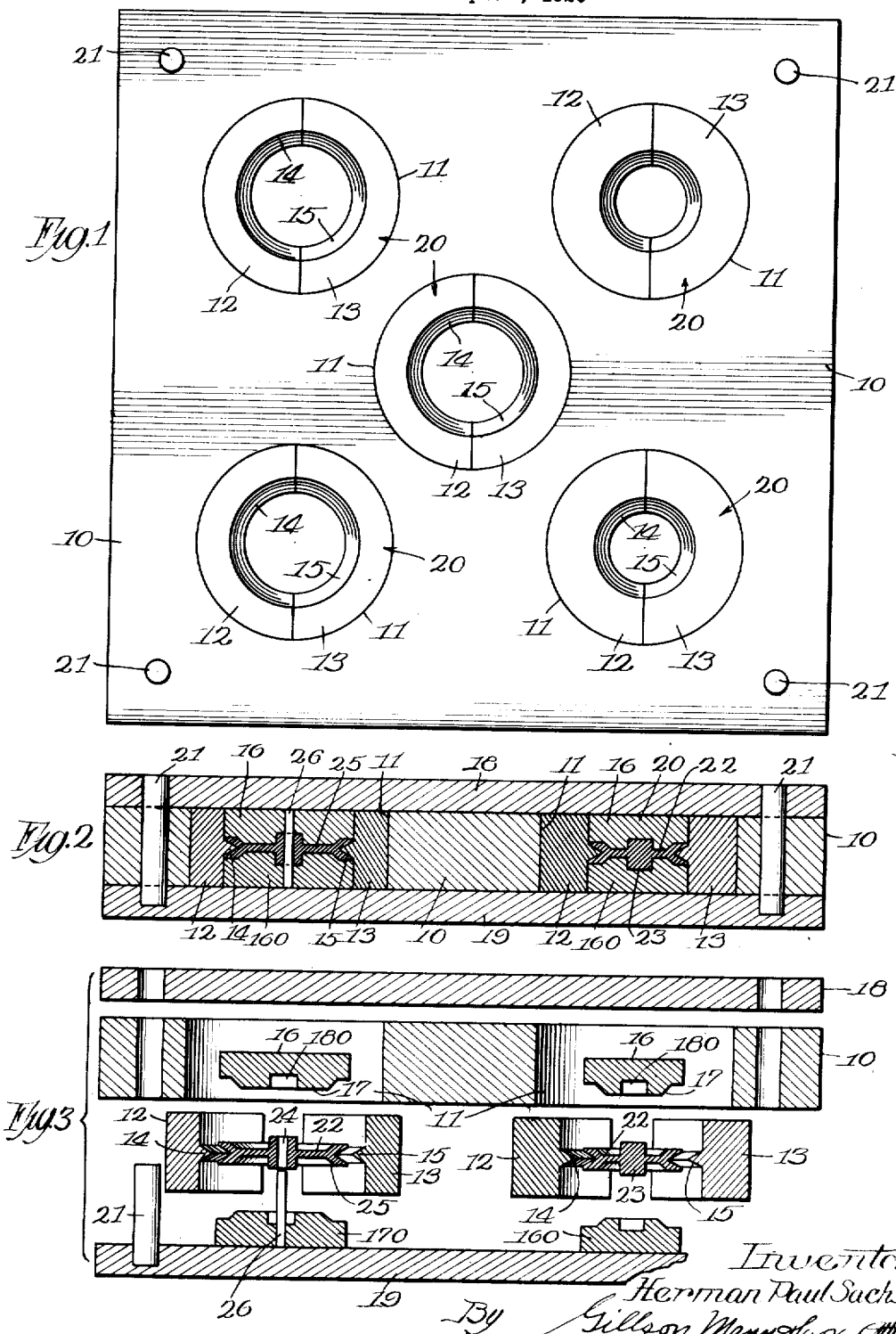
Inventor
Herman Paul Sachse
By Gillson, Mann & Cox Attys Patented Oct. 16, 1928.

1,687,797

UNITED STATES PATENT OFFICE.

HERMAN PAUL SACHSE, OF CHICAGO, ILLINOIS, ASSIGNOR TO CENTRAL SCIENTIFIC COMPANY, OF CHICAGO, ILLINOIS, A CORPORATION OF ILLINOIS.

MOLDING DEVICE.

Application filed September 1, 1926. Serial No 132,966.

This invention relates to devices for molding articles of various shapes and sizes.

One of the objects of the invention is the provision of a new and improved mold for molding articles from the bakelite and other materials while in a plastic or semi-plastic condition.

Another object of the invention is the provision of a new and improved mold that is provided with interchangeable mold blocks for molding articles of different sizes and shapes.

A further object of the invention is the provision of a new and improved sectional mold in which the parts are so constructed that articles having reentrant angles and curves may be formed by the application of pressure, or pressure and heat, to the molds, and when the articles are formed the same may be easily and readily detached from the mold.

A still further object of the invention is the provision of a new and improved mold that is simple in construction, efficient in operation, easily manipulated, readily assembled, and one in which the matrices are interchangeable for forming articles of different forms or dimensions.

Other and further objects and advantages of the invention will appear from the following description taken in connection with the accompanying drawings, in which Fig. 1 is a plan view of the mold plate, showing the molds in position therein, with the upper platen removed;

Fig. 2 is a vertical section of the mold plate, the platens and the molds in assembled relation;

Fig. 3 is an exploded view of the section shown in Fig. 2.

In molding articles having reentrant curves and angles, as pulleys and the like, great difficulty has been experienced in obtaining a mold that will properly form the articles under the pressures that are necessary, and at the same time be so constructed that the articles can be readily removed after they have been molded.

The present invention contemplates the use of a mold so divided that the molded article may be readily removed therefrom, and one in which the parts are firmly held in assembled relation during the pressing operation.

A device for molding bakelite pulleys has been selected by way of example to illustrate one embodiment of the invention. On the drawings, the reference character 10 designates a metallic mold plate through which are one or more, preferably a plurality, of openings 11 of the same dimensions and similar contour. The openings shown are circular, but it is understood they may be otherwise.

The members for forming the cavity of the mold, which for convenience of description will be termed the matrix or mold 20, each comprises a plurality of mold blocks 12 and 13 which together are adapted to make a close fit in any one of said openings. As shown, two duplicate blocks for each opening are employed. These blocks together form a two-part ring, split through its diameter, transversely. The inner periphery of these rings is provided, in the present instance, with inwardly extending V-shape projections 14 and 15, respectively, in the central horizontal plane of said blocks. A cope block 16 having a boss 17 with a central circular recess 180 and a nowel plate 160 are adapted to engage in the upper and lower portions of the opening formed by said ring. The cope blocks and nowel plates are preferably duplicates. The mold, cope and nowel blocks together form a matrix for the pulley.

The external diameters of the molds or matrices and their thicknesses are the same, but their interior diameters will depend on the diameters of the pulleys to be molded. By means of this arrangement the molds are interchangeable, and the complemental parts of each mold being duplicates, the parts may be readily assembled.

The mold plate 10 is adapted to be placed between upper and lower platens 18 and 19, respectively. Dowel pins 21 extending through the upper platen 18, the mold plate 10 and into the lower platen 19, are adapted to guide and position the parts during the pressing operation.

The mold or matrix described above is adapted to form a pulley 22 having a solid hub 23. If it is desired to have an axial opening through the hub of the pulley the nowel plate 170 is provided with an axial opening in which a pin 26 is adapted to be secured. The pin 26 extends through the cavity of the mold and will form the axial opening 24 in the hub of the pulley 25.

In devices for molding phenolic compounds and other materials that are plastic or semi-plastic, at high temperatures, it is the common practice to apply both heat and pressure to the mold during the molding operation, but since the means for heating and applying pressure to the molds constitutes no part of the invention, it was not thought necessary to illustrate or describe the same.

In the operation of the device, the upper platen or plate 18 is removed and the mold blocks and nowel plates for forming the desired size of pulley are inserted in the openings 11, the proper amount of material for forming the pulleys is inserted in the mold cavities, the cope plates 16 are inserted, and the upper platen placed in position, after which heat and pressure are applied by a press in the usual manner.

In removing the articles from the mold, the platen 18 and the mold plate 10 are lifted, leaving the molds or matrices 20 in position on the lower platen. The mold blocks 12 and 13 are now separated laterally, the cope plate 16 lifted from the article and the article removed.

While a mold for forming pulleys has been described it is understood that other articles may be formed by changing the contour of the surfaces forming the mold cavity.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In a molding device, an upper platen, a lower platen, a mold plate, between said platens, and in contact therewith during the molding operation, said plate having a plurality of openings of the same size and contour, extending through said plate, and sectional matrices interchangeably mounted in said openings, said matrices being adapted to form articles of different sizes.

2. In a molding device, a mold plate having a plurality of circular openings therethrough, a plurality of molds for interchangeably engaging in said openings, each mold comprising a two-part mold block, each block being provided with an inwardly extending V-shape extension, cope and nowel blocks co-operating with said mold blocks to form a mold cavity for casting a pulley, and a pin extending axially through said cope and nowel blocks.

3. In a molding device, an upper platen, a lower platen, a metallic nowel plate between said platens and in contact therewith during the molding operation, said plate being provided with a plurality of openings therethrough, said openings being of the same size and contour, and a plurality of interchangeable molds removably mounted in the openings in said plate.

In testimony whereof I affix my signature.

HERMAN PAUL SACHSE.

CERTIFICATE OF CORRECTION.

Patent No. 1,687,797.   Granted October 16, 1928, to

HERMAN PAUL SACHSE.

It is hereby certified that error appears in the printed specification of the above numbered patent requiring correction as follows: Page 2, line 63, claim 3, for the word "nowel" read "mold"; and that the said Letters Patent should be read with this correction therein that the same may conform to the record of the case in the Patent Office.

Signed and sealed this 20th day of November, A. D. 1928.

M. J. Moore,
Acting Commissioner of Patents.

(Seal)

In devices for molding phenolic compounds and other materials that are plastic or semi-plastic, at high temperatures, it is the common practice to apply both heat and pressure to the mold during the molding operation, but since the means for heating and applying pressure to the molds constitutes no part of the invention, it was not thought necessary to illustrate or describe the same.

In the operation of the device, the upper platen or plate 18 is removed and the mold blocks and nowel plates for forming the desired size of pulley are inserted in the openings 11, the proper amount of material for forming the pulleys is inserted in the mold cavities, the cope plates 16 are inserted, and the upper platen placed in position, after which heat and pressure are applied by a press in the usual manner.

In removing the articles from the mold, the platen 18 and the mold plate 10 are lifted, leaving the molds or matrices 20 in position on the lower platen. The mold blocks 12 and 13 are now separated laterally, the cope plate 16 lifted from the article and the article removed.

While a mold for forming pulleys has been described it is understood that other articles may be formed by changing the contour of the surfaces forming the mold cavity.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In a molding device, an upper platen, a lower platen, a mold plate, between said platens, and in contact therewith during the molding operation, said plate having a plurality of openings of the same size and contour, extending through said plate, and sectional matrices interchangeably mounted in said openings, said matrices being adapted to form articles of different sizes.

2. In a molding device, a mold plate having a plurality of circular openings therethrough, a plurality of molds for interchangeably engaging in said openings, each mold comprising a two-part mold block, each block being provided with an inwardly extending V-shape extension, cope and nowel blocks co-operating with said mold blocks to form a mold cavity for casting a pulley, and a pin extending axially through said cope and nowel blocks.

3. In a molding device, an upper platen, a lower platen, a metallic nowel plate between said platens and in contact therewith during the molding operation, said plate being provided with a plurality of openings therethrough, said openings being of the same size and contour, and a plurality of interchangeable molds removably mounted in the openings in said plate.

In testimony whereof I affix my signature.

HERMAN PAUL SACHSE.

CERTIFICATE OF CORRECTION.

Patent No. 1,687,797.                    Granted October 16, 1928, to

HERMAN PAUL SACHSE.

It is hereby certified that error appears in the printed specification of the above numbered patent requiring correction as follows: Page 2, line 63, claim 3, for the word "nowel" read "mold"; and that the said Letters Patent should be read with this correction therein that the same may conform to the record of the case in the Patent Office.

Signed and sealed this 20th day of November, A. D. 1928.

M. J. Moore,
Acting Commissioner of Patents.

(Seal)